Figure 4:
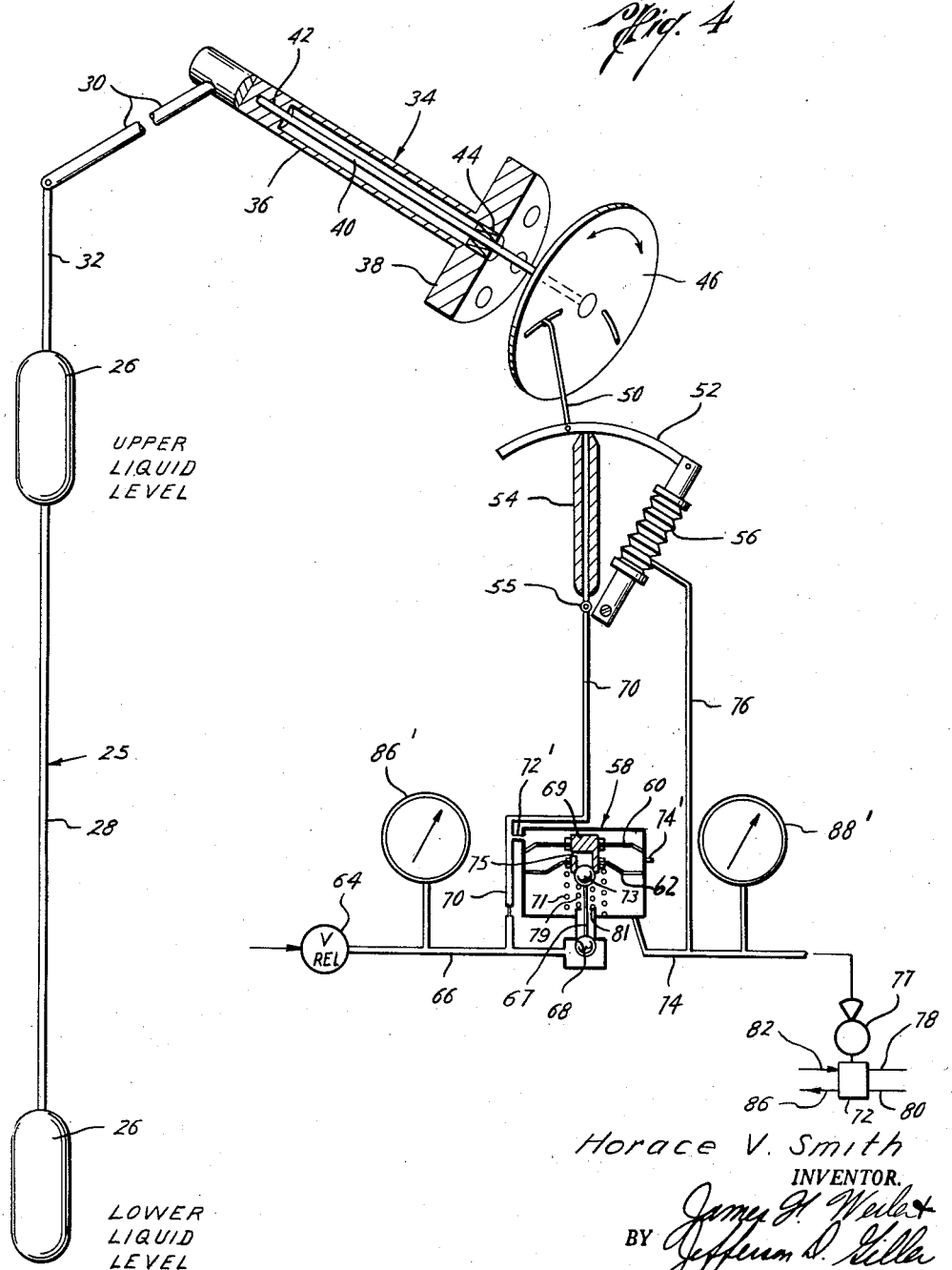

Sept. 30, 1958  H. V. SMITH  2,853,877
RIGID BUOYANCY MASS LIQUID METER
Filed June 23, 1955  4 Sheets-Sheet 1

Fig. 1

Horace V. Smith
INVENTOR.

BY

ATTORNEYS

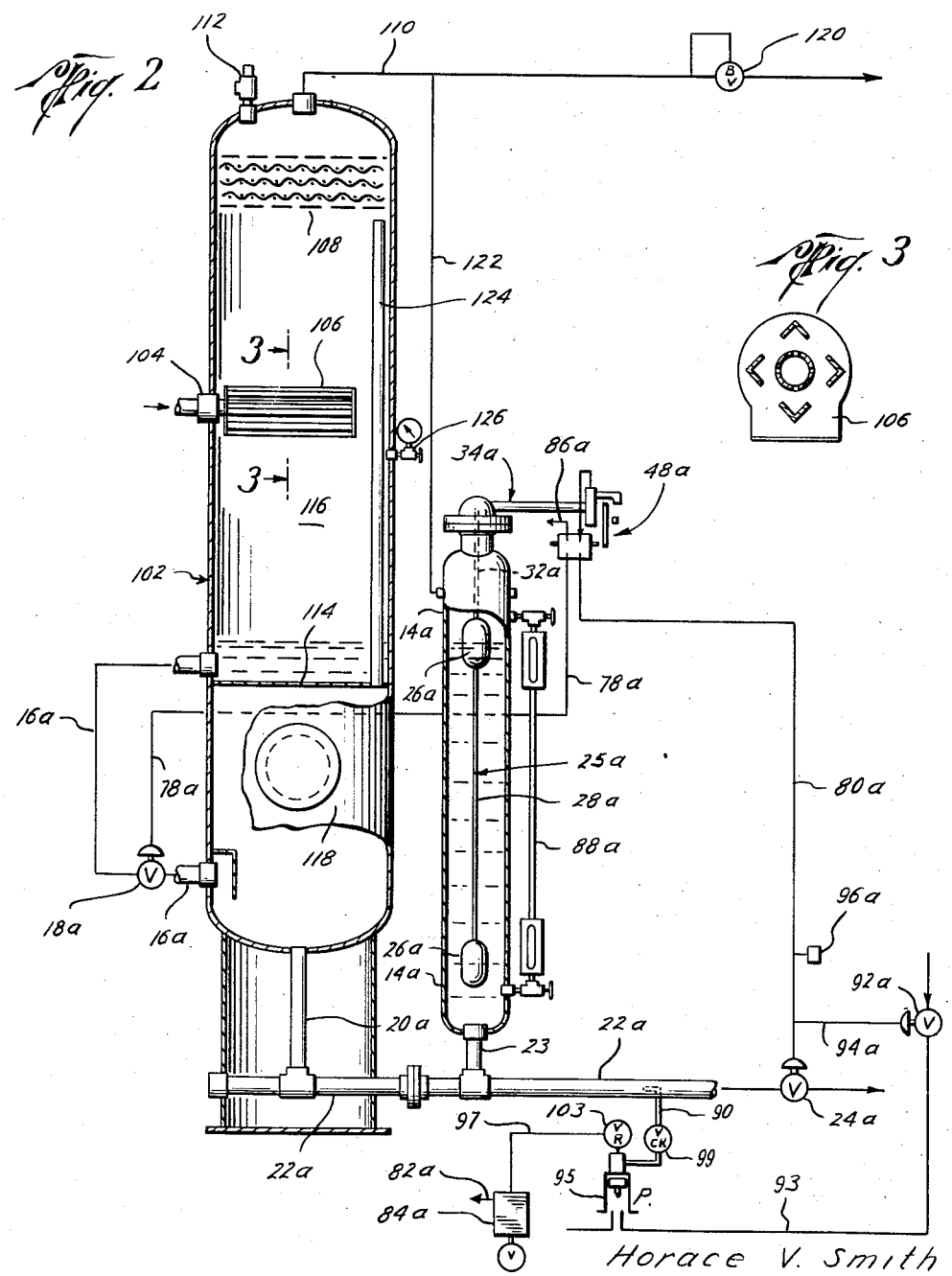

Sept. 30, 1958

H. V. SMITH 2,853,877

RIGID BUOYANCY MASS LIQUID METER

Filed June 23, 1955

4 Sheets-Sheet 3

Horace V. Smith
INVENTOR.

BY

ATTORNEYS

Sept. 30, 1958　　　　　H. V. SMITH　　　　2,853,877
RIGID BUOYANCY MASS LIQUID METER
Filed June 23, 1955　　　　　　　　　　4 Sheets-Sheet 4

Horace V. Smith
INVENTOR.

BY

ATTORNEYS

United States Patent Office 2,853,877
Patented Sept. 30, 1958

2,853,877

RIGID BUOYANCY MASS LIQUID METER

Horace V. Smith, Houston, Tex., assignor to Oil Metering and Processing Equipment Corp., Houston, Tex., a corporation of Texas Application June 23, 1955, Serial No. 517,629

12 Claims. (Cl. 73—224)

The present invention relates to improved liquid metering apparatus and, more particularly, relates to improved liquid metering apparatus which may be used for accurately metering relatively large volumes of liquids under pressure such as in connection with oil and gas wells and gathering systems.

There is a need for a highly accurate and efficiently reliable metering vessel particularly for use in connection with metering of oil and water from oil and gas wells or gathering systems. There have been liquid metering apparatus proposed for this use; however, some of these apparatus do not function accurately when metering liquid under pressure and are not capable of accurately metering large volumes of liquid under these conditions. Some metering apparatus can function under pressure and with large volumes of flow; however, these metering apparatus are not as accurate as desired and there is a need for a more accurate and efficiently reliable metering vessel particularly for use in connection with large volumes of liquid flow under pressure. Additionally, it would be highly desirable to be able to calibrate the metering apparatus for accurate adjustment while in use.

Accordingly, it is a major object of the present invention to provide an improved metering apparatus which efficiently and reliably meters large volumes of liquid under pressure such as in connection with metering oil from oil and gas wells and gathering systems therefor and the like.

Yet a further object of the present invention is the provision of such a metering aparatus which includes reduced or seraphin necks extending above and below each end of the apparatus into which is positioned a divided or straight buoyancy mass for actuating valve control mechanism for regulating inflow and outflow of liquid to and from metering apparatus.

Yet a further object of the present invention is the provision of a metering apparatus of the character mentioned which may be incorporated into and form a part of a separator thus forming what might be termed a metering separator particularly suited for separation of oil and gas and metering the liquid therefrom.

Yet a further object of the present invention is the provision of a metering vessel of the character mentioned which includes a torque or torsion mechanism for actuating a control valve which in turn operates valves for regulating the inflow and outflow of liquid to and from the metering vessel.

Yet a further object of the present invention is the provision of such a metering vessel in which the calibration of the control elements may be effected from the outside so that the metering vessel may readily be calibrated and various repairs made from the outside.

Yet a further object of the present invention is the provision of such a metering vessel which is relatively inexpensive to manufacture, maintain and repair.

Figure 5:
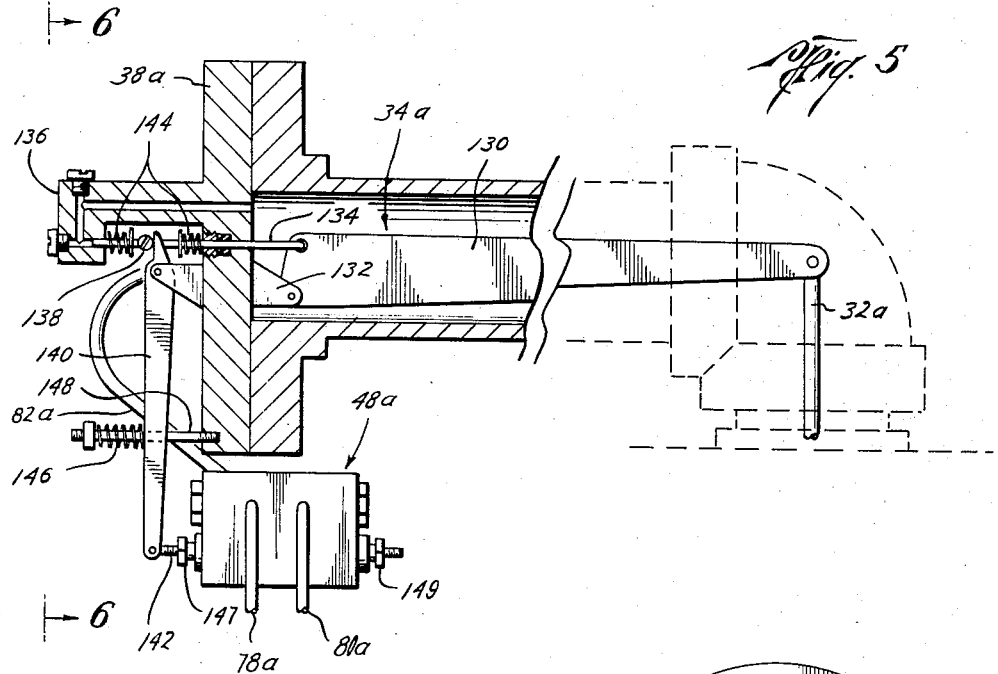
Figure 6:
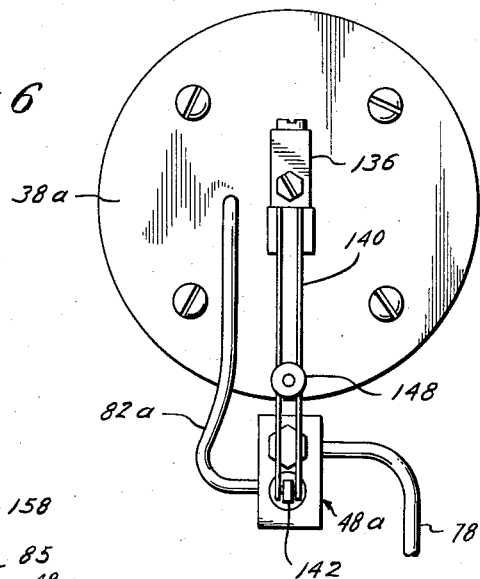
Figure 7:
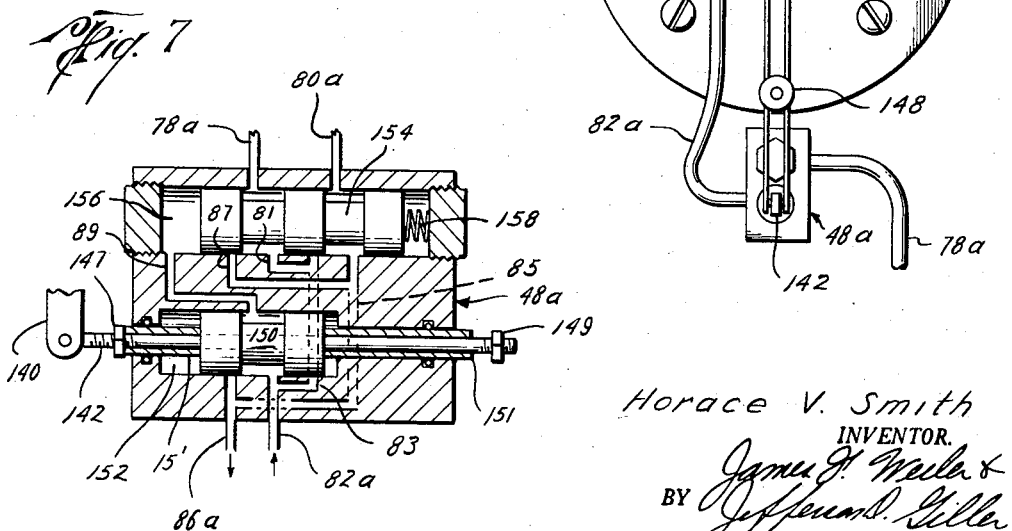

Other and further objects, features and advantages will be apparent from the following description of presently preferred example of the invention, given for the purpose of disclosure and taken in conjunction with the accomanying drawings, where like character references designate like parts throughout the several views and where Figure 1 is a side elevation, partly in section illustrating a presently preferred form of metering vessel according to the invention, Figure 2 is a side elevation, partly in section, illustrating a modified metering apparatus in combination with an oil and gas separator accordng to the invention, Figure 3 is a cross sectional view taken along the line 3—3 of Figure 2, Figure 4 is a perspective side view illustrating the valve actuating mechanism of Figures 1 and 2, Figure 5 is a side view, partly in section, illustrating a modified form of valve actuating mechanism, Figure 6 is an end view taken along the line 6—6 of Figure 5, and Figure 7 illustrates a control pilot valve of the valve actuating mechanism illustrated in Figure 5.

Referring now to the drawings, and particularly to Figure 1, a liquid container or metering vessel 10 is provided which has the main liquid compartment or centrally-enlarged body portion 12 with upper and lower mutually-aligned liquid compartments 14 of reduced diameter. The reduced diameter liquid compartments 14 are known in the trade as seraphin necks in view of the discovery by T. A. Seraphin, U. S. Patent No. 1,277,760 granted September 3, 1918. The shape of the vessel with the enlarged main liquid compartment 12 and reduced diameter liquid compartments is standard conventional practice in the art and this particular shape of metering vessel is recommended by the ASME-API Petroleum P. D. Meter Code No. 1101.

A liquid inlet line 16 controlled by the inflow valve 18 is provided, which is connected to the flow line 20 extending into the liquid container or metering vessel 10 at its lower portion. Similarly, a liquid outflow line 22 controlled by the outflow valve 24 is provided which is connected to the flow line 20. Thus, upon simultaneous actuation of the valves 18 and 24 liquid, such as oil, fills and drains from the liquid container or metering vessel 10. As presently described, these valves are simultaneously controlled by a valve actuating mechanism and the metering vessel may be calibrated to provide a highly accurate and efficient metering of liquid flowing into and out of the vessel 10.

Disposed within the liquid container or metering vessel 10 is a buoyancy member 25 comprised of divided pair of buoyancy masses 26 disposed in the reduced diameter liquid compartments 14 of the metering vessel 10, which divided buoyancy masses are rigidly connected together by the rod 28. It should be noted that the divided buoyancy masses 26 never move out of the reduced diameter liquid compartments 14 of the metering vessel 10 thereby insuring highly accurate results.

As best seen in Figure 4, the divided buoyancy masses 26 are rigidly connected to a crank arm 30 by the arm 32, the crank arm 30 being rigidly connected to a torsion tube assembly, generally designated by the reference character 34. It should be noted that while a divided buoyancy mass is illustrated, a single elongate mass of constant or other diameter may be used.

The torsion tube assembly 34 includes a torsion tube 36, to which the crank arm 30 is rigidly connected, which is rigidly connected to the flange 38 so that the torsion tube 36 may be torqued due to the movement of the divided buoyancy masses 26. A rod 40 is disposed within the torsion tube 36, which rod is rigidly secured to the head of the torsion tube 36, as at 42, but rotatably extends through the flange 38 and bearing 44 to the disk 46 forming a part of the valve actuating mechanism, see Figure 1, generally indicated by the reference numeral 48.

Turning again to Figure 4, a hanger 50 is connected to the disk 46 and to what might be termed a curved piece 52 which rests upon the upper end of the nozzle 54 and which is pivotally secured at one end to the bellows assembly 56. While not shown, in practice the nozzle 54 is adjustable for calibration purposes. Thus, rotation of the rod 40 in a clockwise direction causes a corresponding rotation of the disk 46 and an elevation of the curved piece 52 thereby opening the upper end of the nozzle 54; whereas, rotation of the rod 40 in a counterclockwise direction causes a corresponding rotation of the disk 46 and a lowering of the curved piece 52 to bring it to the position illustrated in Figure 4 for closing the upper end of the nozzle 54 thereby preventing pressure from bleeding through this upper end.

A pressure control pilot 58 is provided which includes a pair of diaphragms 60 and 62 to which a regulated supply of fluid, such as gas, is provided through the regulator valve 64 and line 66 through the pilot valve 68 to the underside of the diaphragm 62 and through the leg 70 to the nozzle 54 and the connected leg 72' to the upper side of the upper diaphragm 60. A bleed port 74' is provided to bleed fluid pressure from the space between the diaphragms 60 and 62. Pressure is supplied from below the control valve diaphragm 62 into pressure line 74 and from the bellows 56 into pressure line 76 joining the pressure line 74 which is connected to a four-way relay valve, generally indicated by the reference numeral 72 with its actuator 77 which is connected by the pressure lines 78 and 80 to the inflow valve 18 and outflow valve 24, respectively, as best seen in Figure 1. Pressure is also supplied by line 82 to the sample container 84. Exhaust line 86 bleeds pressure from valves 18 and 24 through four-way valve 72 when valves 18 and 24 are to be opened. No detailed description is given of the four-way valve 72 and its actuator 77 as this may be any conventional type desired.

Referring again to Figure 4 a supply gauge 86' is connected in the pressure inflow line 66 and an output gauge 88' is connected in the pressure outflow line 74.

The operation of the torsion tube control is as follows: As the buoyancy member 25 is moved slightly up and down in response to the liquid level in the necks or reduced diameter liquid compartment 14 of the liquid container 10, it causes the torsion tube 36 to be torqued in one direction or the other which causes a corresponding rotation of the rod 40. This in turn causes a rotation of the disk 46 and causes the curved piece 52 to be lifted away from the upper end of the nozzle 54 or seated thereon. When the curved piece 52 seats on the upper end of nozzle 54, as illustrated, and cuts off escapement of gas through this nozzle 54, a pressure increase occurs on the upper side of diaphragm 60 which because it is rigidly connected to diaphragm 62 by spacer 69 causes both diaphragms to move downwardly pushing the double-ended valve assembly 67 down opening pilot valve 68. This permits gas under pressure in line 66 to flow into the space below diaphragm 62 and into line 74 to the four-way valve 72 for actuating the valves 18 and 24. The pilot valve 68 remains open only until the force on the lower diaphragm 62 area reaches an equilibrium with the loading pressure on the upper diaphragm 60 area. When this happens the coil spring 71 pushes both diaphragms 60 and 62 upwardly causing pilot valve to close through the action of spring 79.

When movement of buoyancy member 25 causes curved piece 52 to uncover the upper end of nozzle 54 the pressure in pressure control pilot 58 above diaphragm 60 is relieved and the greater pressure momentarily existing below diaphragm 62 causes diaphragms 60 and 62 to move upwardly opening valve 73 in pressure control pilot 58. This allows gas under pressure to pass from below diaphragm 62 through port 75 into the space between diaphragms 60 and 62 and out bleeder port 74'. Equilibrium will again cause pilot valve 68 to close.

Such operation causes an "on-off" pressure to be applied to the four-way pilot valve 72 for controlling the supply of actuating pressure to the various valves in the system, as previously mentioned.

No more detailed description is deemed necessary of the particular liquid level control illustrated in Figure 4 as all of it except the buoyancy member 25 and the four-way relay valve 72 is a commercial assembly readily available on the market manufactured by Black, Sivalls and Bryson, Inc. of Tulsa, Oklahoma and is known as a Climax Control Type 887 with a 1450 pilot. Other satisfactory units are available from Fisher Governor Co., Mason-Neilan Co. and others.

Referring again to Figure 1, a liquid level gauge 88 is provided so that the level of the liquid in the vessel is visible at all times, and a sampler is provided which includes an inflow line 90 and a control valve 92 actuated by gas or air pressure in line 94 connected to line 78. The sampler arrangement is so constructed and arranged to take a sample of liquid each time the vessel fills and drains. Thus, liquid, such as oil, emulsion or water flowing in the inflow line 16 also rises in the sample tube 90 to the same height as that in the vessel 10, the two-way valve 92 being in a position to permit a full rise. As soon as the vessel 10 has reached its upper liquid level for dumping, the valve 92 is actuated simultaneously with the valves 18 and 24 which causes the liquid in the sample tube 90 above the valve 92 to flow into the sample container 84 which is maintained under pressure of the order of the system by the line 82. Thus, a sample is automatically collected for each metered volume of liquid and may be drained to atmosphere or may be analyzed under pressure.

A counter 96 is provided, such as in the pressure line 80 to the outflow valve 24 so that an accurate count is automatically maintained of each time the vessel 10 fills and empties. The counter 96 is diagrammatically illustrated, but any conventional counter mechanism or recorder may be used, a number of which are on the commercial market and, accordingly, no detailed description thereof is deemed necessary.

The liquid container or metering vessel 10 may obviously be supported by any suitable framework or structure and, for this purpose, the supports 98 connected to the liquid compartment or metering vessel 10 and the base 100 are illustrated.

The operation of the liquid metering vessel of Figure 1 with the control assembly illustrated in Figure 4 is as follows. Liquid, such as oil or water or mixtures thereof, is permitted to enter inflow line 16 when valve 18 is open, which in turn flows in line 20 up into the interior of the vessel 10, the outflow valve 24 being closed. When the liquid in the vessel 10 reaches a predetermined level, such as that illustrated in dotted lines in the upper liquid compartment 14, the buoyancy member 25 moves upwardly thereby causing the torsion assembly 34 and pilot control 48 to be actuated to provide pressure to the inflow valve 18 through four-way valve 72 thereby closing this valve 18 and permitting pressure to be bled off the outflow valve 24 thereby simultaneously opening this valve. This permits the liquid in the vessel 10 to drain out the flow line 20 and outflow line 22 until it reaches a predetermined level in the lower liquid compartment 14, such as indicated by the dotted lines, where the buoyancy member 25 lowers slightly thereby applying torque to the torsion tube 34 in the opposite direction and thereby actuating the control mechanism 48 and the control valve 72 thereby causing a simultaneous closing of the outflow valve 24 and an opening of the inflow valve 18 thereby permitting liquid to again flow into the liquid metering vessel 10 thereby repeating the cycle. The counter 96 counts or records each time the vessel has been filled and emptied thereby giving an accurate indication thereof. In addition, as mentioned previously, the sampler valve 92 is also simultaneously actuated thereby collecting a sample of each quantity of oil filling and emptying the liquid metering vessel 10.

When liquid container or metering vessel 10 is filling the gas above the liquid in the metering vessel is allowed to escape through equalizing connection 95. When the liquid container or metering vessel 10 is emptying gas or vapor enters through equalizing connection 95 to replace the discharged liquid. Thus the metering vessel 10 can be operated at atmospheric pressure or otherwise.

If the metering vessel is operated at atmospheric pressure or less extraneous gas at a suitable pressure is supplied to pressure control pilot 58.

It should be noted that the liquid may flow into the liquid container or metering vessel 10 in large volumes and under high pressures without interfering with the operation or accuracy of the unit. Also, the divided buoyant masses 26 do not move out of the reduced diameter liquid compartments or necks 14 thereby insuring very accurate and reliable results because of the large size of the buoyance masses 26 in the reduced diameter liquid compartments 14. In addition, the torsion tube control elements and associated pilot control elements are very accurate, sensitive and efficient thereby providing for highly efficient and reliable results. In addition, it is noted that all calibration can be made outside of the vessel without interrupting the operation of the apparatus so that the metering vessel may accurately be calibrated or adjusted while in operation.

It should be noted that in practice the unit is calibrated by rotating the nozzle 54 about its pivot 55 and by adjusting the nozzle 54 with a micrometer screw, not shown.

Referring now to Figure 2, a modified form of metering vessel is illustrated which forms an integral part of a vertical oil and gas separator. For convenience of disclosure, a modified form of valve actuating mechanism is illustrated as well as a modified sampling arrangement, but it will be understood that any preferred valve actuating mechanism may be used with the metering vessel, whether alone or in combination with a vertical oil and gas separator or with any type sampler. Accordingly, these various control elements and samplers may be substituted in the various arrangements disclosed.

Turning now to Figure 2 a metering separator 102 is provided which has the well fluid inlet 104 for introducing well fluid into the separator 102. A degassing element 106 is provided so that gas flows upwardly through a conventional screen or mist extracting element 108 and out the gas outlet line 110. A conventional relief valve 112 is provided at the upper end of the separator 102.

A partition 114 is provided in the vertical separator 102 thereby providing what might be termed a separating and liquid accumulating chamber 116 and a liquid metering chamber or main liquid compartment 118 therebelow. Thus, as oil and gas flows into the separating chamber 116 the gas flows out the outflow line 110 and the oil flows into the separating and accumulating chamber 116 and subsequently to the metering chamber 118. A discharge line 16a supplies oil from the separating and liquid accumulating chamber 116 to the metering chamber or main liquid compartment 118 in response to actuation of the valve 18a. The metering section of the vessel includes the main chamber 118 corresponding to that indicated by the reference numeral 12 in Figure 1, and what is in effect an elongated single seraphin neck 14a, corresponding to the pair of mutually-aligned compartments 14 in Figure 1, which extends above and below the main vessel 118 and which is connected by the flow lines 20a, 22a and line 23. Thus, in effect, the liquid container or metering vessel has an enlarged intermediate or main liquid container and reduced necks or mutually-aligned liquid compartments at the upper and lower ends due to the fact that the seraphin necks or liquid level control tube extend above and below the main liquid container and are in fluid communication therewith at all times. The discharge valve 24a also serves to permit emptying of the metering vessel. Thus, as the controls 34a and 48a are actuated in response to a movement of the buoyancy member 25a the valves 18a and 24a are simultaneously opened and closed, respectively, to permit a filling of the metering vessel composed of the metering portion or main liquid compartment 118 and seraphin necks or liquid compartments 14a until the controls are actuated at the upper level to cause simultaneous closing of the valve 18a and opening of the discharge valve 24a thereby causing a dumping of the vessel. When the lowermost liquid level is reached in the seraphin tube 14a the discharge valve 24a is closed and the inlet valve 18a is simultaneously opened and the metering vessel again fills. In the meantime, liquid is accumulating in the separating chamber 116 and until enough liquid has flowed into the metering chamber 118, the control tube 14a will not fill to an extent to reverse the positions of the inflow and outflow valves to cause a dumping of the liquid within the chamber. The counter or recorder 96a keeps an accurate record of each time the metering vessel fills and empties so that an accurate indication of the volume of liquid flowing through the metering separator is maintained.

In the event the control mechanism and sampler illustrated in Figure 1 is used, the operation is the same as that previously mentioned and no more detailed description is necessary except to point out that a conventional back pressure valve 120 is provided in the gas outlet line 110 and gas equalizing lines 122 and 124 are provided to the seraphin tube 14a and separating chamber 116, respectively, to provide an equalization of pressure throughout the system so that large quantities of liquid under pressure may accurately be separated and the liquids metered. A conventional pressure gauge 126 is provided to give an indication of the pressures within the separating chamber 116.

As mentioned previously, the control elements illustrated in Figures 1 and 4 may be used; however, for the purpose of disclosure, a modified form of control element is illustrated in connection with the metering separator of Figure 2, as best seen in Figures 5–7, inclusive. Turning now to Figure 5, the arm 32a extending from the divided buoyancy masses 26a is connected to an arm 130 which is pivotally connected to a rigid bracket 132 and a rod 134 slidable in the housing member 136. The rod 134 has a projection 138 which engages the upper end of a crank arm 140 which is connected at its other end to a plunger 142 of the pilot control assembly 48a. A pair of equalizing springs 144 are disposed on opposite sides of the upper end of the crank arm 140 to maintain proper positioning of rod 134 and projection 138. Also, an additional spring 146 disposed about the rod 148 engages the central portion of the crank arm 140 to serve as a means of calibrating and adjusting the liquid levels in the vessel. Thus, as the arm 32a is moved up and down in response to movement of the buoyant member 25a, the arm 130 is moved upwardly and downwardly which in turn actuates the crank arm 140 thereby actuating the rod 142. It seems obvious that the arrangement of spring 146 in conjunction with the adjustment of stop nuts 147 and 149 provides a calibrating means to adjust the liquid levels in the vessel.

Turning to Figure 7, the controller 48a includes a primary piston 150 slidable on the piston rod or plunger 142 which moves in the primary piston chamber 152. A sleeve 151 is secured to each end of primary piston 150, each of which sleeves 151 is slidable in the housing of controller 48a so that action of stop nuts 147 and 149 on sleeves 151 moves primary piston 150. Also included in the controller 48a is a secondary piston 154 which moves in the secondary piston chamber 156. A series of interconnecting passages are provided in the controller 48a and connected to the operating fluid inflow line 82a is a flow line 83 which extends through the primary piston chamber 152 and into the secondary piston chamber 156. An exhaust line 86a extends into the primary piston chamber 152 and has an interconnecting leg 85 which extends into the secondary piston chamber 156 and a lateral tube 87 which similarly extends but at a spaced point into the secondary piston chamber 156. Similarly, a flow leg extends from the input pressure fluid line 83 into the secondary chamber 156 and at points spaced from the line 83. In addition a pressure flow line 89 extends from the central portion of the primary piston chamber 152 to an end portion of the secondary piston chamber 156.

In operation, when the parts are in the position illustrated in Figure 7, the primary piston 150 will be in an inward position thereby permitting flow of operating pressure through line 82a, main piston chamber 152, flow line 89 into the left hand end of the secondary piston chamber 156 thereby moving the secondary piston 154 to the right thereby permitting flow of pressure out line 80a but preventing flow of pressure in line 78a. Upon movement of the buoyancy member, the crank arm 140 is moved thereby moving the primary piston 150 to the left hand side of the primary piston chamber 152 thereby cutting off the flow of pressure into the left hand side of the secondary piston chamber 156 and draining it of pressure through exhaust line 86a. The spring 158 urges the secondary piston 154 over to the left hand side thereby cutting off flow of pressurized fluid in line 80a and permitting flow through lines 82a, 83 and 81 out through line 78a. Upon movement of the crank arm 140 in response to movement of the divided buoyancy masses, the primary piston is again moved inwardly and pressure is cut off in line 78a and applied in line 80a as previously mentioned.

Thus, pressure is alternately supplied and bled for actuating the inflow and outflow valves 18a and 24a for filling and dumping the metering vessel. It is noted that the stop nuts 147 and 149 on the rod 142 provide a lost motion connector by which snap action is obtained for actuating the valve as described.

From the foregoing description it can be seen that the pilot control assembly 48a includes within its structure and operation the function of the four-way valve 72. No more detailed description of this control mechanism is deemed necessary as this is a commercial control mechanism readily available on the market and sold by the Hippen-Murphy Company. This liquid level controller is further illustrated in U. S. Patent No. 2,653,623.

It should be noted that with this particular pilot it is unnecessary to reduce the pressure on the operating fluid. That is, if three thousand pounds working pressure is used on the unit, the same working pressure can be used through the pilot. This is true and possible because the primary and secondary pistons are balanced. Also, the primary piston is hydrostatically balanced and the secondary piston is balanced by means of a spring. In addition, this particular pilot operates on liquid as well as with gas.

Referring again to Figure 2, a modified sampler arrangement is illustrated which works off the discharge line 22a. Here the control valve 92a for the sampler is connected to a gas pressure line 93 which works a pump 95 for pumping liquid received in the sample line 90 through the line 97 into the sample container 84a. The check valve 99 is provided in the flow line 90 and a back pressure valve 103 is provided in the flow line 97 for preventing flow of liquid from pressure line 22a into the sample container 84a. The pump 95 pumps the liquid against the relief valve 103. A pressure line 82a may be connected to the sample container 84a so that samples may be collected under pressures of the order of the system or, if desired, the samples may be collected at atmospheric pressure. Thus, in this embodiment with the pump 95 one or more samples may be collected each time a discharge is made.

It should be noted that in this embodiment as well as in the other embodiments a single buoyancy member of constant or other diameter may be used.

In connection with the embodiment of Figure 2, all parts not specifically described function in the same manner as in connection with the embodiment of Figure 1, the reference letter "a" being added to like parts. Accordingly, no more description of this particular embodiment is deemed necessary.

While the invention has been applied to a vertical oil and gas separator it will be understood that it may also be applied to any desired separator or treating vessel, such as the horizontal type or other type if desired. Also, it is noted that all of these controls and samplers may be interchanged and used with one another, the particular arrangement being illustrated only for the purpose of disclosure and simplicity of description. Further, highly accurate results under all pressure conditions and volumes of flow are obtained with the buoyancy masses remaining in the reduced diameter portions or seraphin necks. Also, the metering vessel may readily be calibrated while in operation and an efficiently reliable and accurate metering vessel is provided which may be calibrated as desired and which accurately meters and samples liquid in a completely automatic and continuous operation.

It will be understood that an additional metering vessel or vessels may be used with the separator or treating vessel. For example, a metering vessel may have its buoyancy mass so weighted as to sink in one liquid, say oil, and to be buoyed by another, say water. In this way both oil and water may separately be metered, it only being necessary that appropriate connections be made to the vessel for gravity separation and separate flow into respective metering vessels.

In the present invention the buoyancy mass 25 may be one that sinks in the liquid being metered or it may be one that floats as either type will work.

If desired, of course, the sampler may be omitted altogether. In addition, numerous rearrangement of parts and substittution of parts will readily suggest themselves to those skilled in the art which are encompassed within the spirit of the invention and the scope of the appended claims. For example, the vessel may be of constant diameter and elongated, and the valves may be opened and closed by the application of pressure rather than by applying and bleeding off pressure, for example, with a four-way, relay pilot valve 164A available from Fisher Governor Company of Marshalltown, Iowa. In addition, other buoyancy actuated liquid level controls may be used; for example, the Bourdon tube type and commercial controls such as there are available; for example, Type 2503–249P, Top Mounting Liquid Level Controller and Type 2500S–249P from Fisher Governor Company, Marshalltown, Iowa. Thus, numerous substitutions and changes in parts may be made.

While the present invention has been described in connection with metering oil and water and in connection with a separator, it will be understood that the invention may be used for metering any type of liquid under any and all pressure conditions and in combination with various other apparatus.

The present invention therefore is well suited to carry out the objects and attain the advantages and ends mentioned as well as others inherent therein. Accordingly, the invention is to be limited only by the spirit thereof and the scope of the appended claims.

What is claimed is:

1. A liquid metering apparatus comprising, a liquid container having a main liquid compartment, inlet and outlet passages and inlet and outlet valves in said passages, mutually aligned liquid compartments extending above and below said main liquid compartment, said compartments being of materially smaller cross-section than that of said main liquid compartment and being in liquid communication therewith, a buoyancy member comprised of a pair of buoyancy masses rigidly connected together, one each of said buoyancy masses being disposed in one each of said liquid compartments, said buoyancy masses movable with changing liquid level into and from said liquid compartments, and valve control mechanism actuated by movement of said buoyancy member in one direction for simultaneously opening and closing the inlet and outlet valves, respectively, and for simultaneously closing and opening the inlet and outlet valves, respectively, upon movement of said buoyancy member in the other direction.

2. The liquid metering apparatus of claim 1 where the valve control mechanism comprises a torsion tube assembly including a torsion tube connected at one end to said buoyancy member and at the other end to a rigid member, movement of said buoyancy member torquing said torsion tube, a rod rigidly connected to the one end of the torsion tube and rotatably extending through the rigid member, a control pilot assembly connected to and actuated by rotation of said rod, said control pilot assembly including a pressurized system and pressure responsive means for actuating said inlet and outlet valves.

3. The liquid metering apparatus of claim 1 where the valve control mechanism comprises an arm connected at one end to said buoyancy member and pivotally connected at the other end to a rigid member, a crank arm connected to said first-mentioned arm and actuated by movement thereof, and a pilot valve assembly actuated by movement of said crank arm, said pilot valve assembly including a pressure system and pressure responsive means for actuating said inlet and outlet valves upon actuation of said crank arm.

4. The liquid metering apparatus of claim 1 including a sampler in fluid communication with said inlet and outlet passages and constructed and arranged to obtain a measured sample of liquid each time said liquid metering apparatus fills and drains.

5. The liquid metering apparatus of claim 1 including counter mechanism for counting each time the liquid metering apparatus fills and drains.

6. A metering separator including a body comprised of an upper separator chamber and a lower main liquid compartment, means for introducing liquid and gas into the separation chamber, outlet means at the upper end of the separator chamber for discharging gas therefrom, outlet means at the lower end of the separator chamber for discharging liquid therefrom, said main liquid compartment having inlet and outlet passages including inlet and outlet valves therein, said inlet passage connected to said liquid discharge passage from said separator chamber, mutually aligned liquid compartments extending above and below said main liquid compartment, said compartments being of materially smaller cross-section than that of said main liquid compartment and being in liquid communication therewith, a buoyancy member comprised of a pair of buoyancy masses rigidly connected together, one each of said buoyancy masses being disposed in one each of said liquid compartments, said buoyancy member movable with changing level of liquid into and from said liquid compartments, and valve control mechanism actuated by movement of said buoyancy member in one direction for simultaneously opening and closing the inlet and outlet valves, respectively, and for simultaneously closing and opening the inlet and outlet valves, respectively, upon movement of said buoyancy member in the other direction.

7. The metering separator of claim 6 including a counter mechanism associated with said main liquid compartment for counting each time said main liquid compartment fills and drains.

8. A liquid metering apparatus comprising a liquid container having inlet and outlet passages and inlet and outlet valves in said passages, a rigid buoyancy member disposed in the container and extending from the upper liquid level to the lower liquid level in the container, said buoyancy member moving with changing liquid level in the container, and valve control mechanism actuated by movement of the buoyancy member in one direction for simultaneously opening and closing the inlet and outlet valves, respectively, and for simultaneously closing and opening the inlet and outlet valves, respectively, upon movement of said buoyancy member in the other direction.

9. The liquid metering apparatus of claim 8 where the liquid container has mutually aligned liquid compartments extending above and below the container into which the ends of the buoyancy member extends, said compartments being of materially smaller cross section than that of the liquid container.

10. A liquid metering apparatus comprising a liquid container having inlet and outlet passages and inlet and outlet valves in said passages, liquid compartments in fluid communication with said liquid container and extending above and below the liquid container, said compartments being of materially smaller cross-section than that of the liquid container, a rigid buoyancy member having its ends disposed in the liquid compartments, said buoyancy member moving with changing liquid level in said compartments, and valve control mechanism actuated by movement of the buoyancy member in one direction for simultaneously opening and closing the inlet and outlet valves, respectively, and for simultaneously closing and opening the inlet and outlet valves, respectively, upon movement of said buoyancy member in the other direction.

11. A liquid metering apparatus comprising, a main liquid compartment having a passage for inflow and outflow of liquid, a valve assembly including valve elements controlling inflow and outflow of the liquid to and from the main liquid container, liquid compartments extending above and below said main liquid compartment, said compartments being of materially smaller cross-section than that of said main liquid compartment and being in liquid communication therewith, a rigid buoyancy member having its ends disposed in said liquid compartments, said buoyancy member movable with changing liquid level into and from said liquid compartments, and valve control mechanism actuated by movement of said buoyancy member in one direction for simultaneously opening and closing the inflow and outflow valve elements, respectively, and for simultaneously closing and opening the inflow and outflow valve elements, respectively, upon movement of said buoyancy member in the other direction.

12. A liquid metering apparatus comprising a liquid container having a passage for inflow and outflow of liquid, a valve assembly including valve elements controlling inflow and outflow of the liquid to and from the liquid container, a rigid buoyancy member disposed in the liquid container and extending from the upper liquid level to the lower liquid level in the container, said buoyancy member moving with changing liquid level in the liquid container, and valve control mechanism actuated by movement of the buoyancy member in one direction for simultaneously opening and closing the inflow and outflow valve elements, respectively, and for simultaneously closing and opening the inflow and outflow valve elements, respectively, upon movement of said buoyancy member in the other direction.

References Cited in the file of this patent

UNITED STATES PATENTS

| | | |
|---|---|---|
| 1,611,017 | Fuller | Dec. 14, 1926 |
| 2,158,381 | Raymond | May 6, 1939 |
| 2,555,452 | McIntyre | June 5, 1951 |
| 2,576,561 | Binford | Nov. 27, 1951 |